(12) United States Patent
Pletz et al.

(10) Patent No.: US 8,752,759 B1
(45) Date of Patent: *Jun. 17, 2014

(54) METHOD AND SYSTEM FOR IMPLEMENTING A CARD PRODUCT WITH MULTIPLE CUSTOMIZED RELATIONSHIPS

(71) Applicant: JPMorgan Chase Bank, N.A., New York, NY (US)

(72) Inventors: Tracy M. Pletz, Wilmington, DE (US); Howard C. Seidel, Kennett, PA (US); Joseph Rochford, West Chester, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,998

(22) Filed: Jun. 24, 2013

Related U.S. Application Data

(63) Continuation of application No. 13/528,936, filed on Jun. 21, 2012, now Pat. No. 8,469,265, which is a continuation of application No. 12/176,658, filed on Jul. 21, 2008, now Pat. No. 8,245,909, which is a continuation of application No. 11/202,270, filed on Aug. 12, 2005, now Pat. No. 7,401,731.

(60) Provisional application No. 60/684,985, filed on May 27, 2005.

(51) Int. Cl.
*G06F 17/00* (2006.01)

(52) U.S. Cl.
USPC .......................................... 235/375; 379/380

(58) Field of Classification Search
USPC .......................................... 235/375, 379, 380
See application file for complete search history.

(56) References Cited

U.S. PATENT DOCUMENTS 3,634,669 A * 1/1972 Soumas et al. ............... 705/36 R
3,713,235 A * 1/1973 Roberts ............................ 283/99

(Continued)

FOREIGN PATENT DOCUMENTS

CA 2293321 6/1998
CA 2293321 12/1998

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — Allyson Trail
(74) *Attorney, Agent, or Firm* — Hunton & Williams LLP

(57) ABSTRACT

According to one embodiment, the present invention relates to a method and a system for implementing a card product or access mechanism with multiple relationships with an issuing entity (e.g., bank, etc.) where each relationship may be defined by one or more sets of rules that are customized for a particular customer. A computer implemented method and system for implementing a mechanism with multiple customized relationships may involve identifying one or more customized rules for an access mechanism associated with a customer; establishing a plurality of accounts for the customer wherein the plurality of accounts comprise different accounts with different account characteristics; and invoking one of the plurality of accounts for a transaction through the access mechanism, based at least in part on the one or more customized rules; wherein the plurality of accounts share at least one funding account.

22 Claims, 6 Drawing Sheets

(56) References Cited

U.S. PATENT DOCUMENTS

| | | | |
|---|---|---|---|
| 3,946,206 A * | 3/1976 | Darjany | 360/2 |
| 4,047,033 A * | 9/1977 | Malmberg et al. | 250/341.1 |
| 4,058,220 A | 11/1977 | Torongo | |
| D248,203 S | 6/1978 | Morse | |
| 4,130,881 A | 12/1978 | Haessler et al. | |
| 4,465,206 A | 8/1984 | Sorel et al. | |
| 4,545,838 A | 10/1985 | Minkus et al. | |
| 4,582,985 A | 4/1986 | Lofberg | |
| 4,614,861 A | 9/1986 | Pavlov et al. | |
| 4,634,845 A | 1/1987 | Riley et al. | |
| 4,643,452 A | 2/1987 | Chang et al. | |
| 4,689,478 A | 8/1987 | Hale et al. | |
| 4,700,055 A | 10/1987 | Kashkashian, Jr. | |
| 4,746,787 A | 5/1988 | Suto et al. | |
| 4,750,119 A | 6/1988 | Robertson et al. | |
| 4,752,676 A | 6/1988 | Leonard et al. | |
| 4,754,418 A | 6/1988 | Hara | |
| 4,766,293 A | 8/1988 | Boston | |
| 4,766,539 A | 8/1988 | Fox | |
| 4,789,928 A | 12/1988 | Fujisaki | |
| 4,822,985 A | 4/1989 | Boggan et al. | |
| 4,831,242 A | 5/1989 | Englehardt | |
| 4,831,526 A | 5/1989 | Luchs | |
| 4,837,422 A | 6/1989 | Dethloff et al. | |
| 4,868,376 A | 9/1989 | Lessin et al. | |
| 4,870,259 A | 9/1989 | Boggan et al. | |
| 4,882,675 A | 11/1989 | Nichtberger et al. | |
| 4,897,533 A | 1/1990 | Lyszczarz | |
| D305,887 S | 2/1990 | Nishimura | |
| 4,906,826 A | 3/1990 | Spencer | |
| 4,908,521 A | 3/1990 | Boggan et al. | |
| 4,923,288 A | 5/1990 | Allen et al. | |
| 4,928,001 A | 5/1990 | Masada | |
| 4,941,090 A | 7/1990 | McCarthy | |
| 4,943,707 A | 7/1990 | Boggan | |
| 4,953,085 A | 8/1990 | Atkins | |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,978,401 A | 12/1990 | Bonomi | |
| 4,992,940 A | 2/1991 | Dworkin | |
| 5,025,372 A | 6/1991 | Burton et al. | |
| 5,049,728 A | 9/1991 | Rovin | |
| 5,055,662 A | 10/1991 | Hasewaga | |
| 5,080,748 A | 1/1992 | Bonomi | |
| 5,095,194 A | 3/1992 | Barbanell | |
| 5,117,355 A | 5/1992 | McCarthy | |
| 5,146,068 A | 9/1992 | Ugawa et al. | |
| 5,175,416 A | 12/1992 | Mansvelt | |
| 5,177,342 A | 1/1993 | Adams | |
| 5,180,901 A | 1/1993 | Hiramatsu | |
| 5,185,697 A | 2/1993 | Jacobs et al. | |
| 5,191,522 A | 3/1993 | Bosco et al. | |
| 5,192,947 A | 3/1993 | Neustein | |
| 5,202,286 A | 4/1993 | Nakatani | |
| 5,202,826 A | 4/1993 | McCarthy | |
| 5,206,488 A | 4/1993 | Teicher | |
| 5,206,803 A | 4/1993 | Vitagliano | |
| 5,214,700 A | 5/1993 | Pinkas et al. | |
| 5,218,631 A | 6/1993 | Katz | |
| 5,247,190 A | 9/1993 | Friend et al. | |
| 5,276,311 A | 1/1994 | Hennige | |
| 5,287,268 A | 2/1994 | McCarthy | |
| 5,287,269 A | 2/1994 | Dorrough et al. | |
| 5,297,026 A | 3/1994 | Hoffman | |
| 5,311,594 A | 5/1994 | Penzias | |
| 5,326,959 A | 7/1994 | Perazza | |
| 5,326,960 A | 7/1994 | Tannenbaum | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,359,183 A | 10/1994 | Skodlar | |
| 5,361,062 A | 11/1994 | Weiss et al. | |
| 5,365,575 A | 11/1994 | Katz | |
| 5,383,113 A | 1/1995 | Knight | |
| 5,397,881 A | 3/1995 | Mannik | |
| 5,399,502 A | 3/1995 | Friend et al. | |
| 5,401,827 A | 3/1995 | Holmes et al. | |
| RE34,915 E | 4/1995 | Nichtberger et al. | |
| 5,424,524 A | 6/1995 | Ruppert et al. | |
| 5,450,477 A | 9/1995 | Amarant et al. | |
| 5,453,601 A | 9/1995 | Rosen | |
| 5,455,407 A | 10/1995 | Rosen | |
| 5,457,305 A | 10/1995 | Akel et al. | |
| 5,459,306 A | 10/1995 | Stein et al. | |
| 5,465,206 A | 11/1995 | Hilt et al. | |
| 5,466,919 A | 11/1995 | Hovakimian | |
| 5,471,669 A | 11/1995 | Lidman | |
| 5,477,038 A | 12/1995 | Levine et al. | |
| 5,477,040 A | 12/1995 | Lalonde | |
| 5,479,494 A | 12/1995 | Clitherow | |
| 5,482,139 A | 1/1996 | Rivalto | |
| 5,483,444 A | 1/1996 | Malark et al. | |
| 5,483,445 A | 1/1996 | Pickering | |
| 5,500,514 A | 3/1996 | Veeneman et al. | |
| 5,503,891 A | 4/1996 | Marshall et al. | |
| 5,511,114 A | 4/1996 | Stimson et al. | |
| 5,512,654 A | 4/1996 | Holmes et al. | |
| 5,513,102 A | 4/1996 | Auriemma | |
| 5,521,363 A | 5/1996 | Tannenbaum | |
| 5,530,232 A | 6/1996 | Taylor | |
| 5,530,235 A | 6/1996 | Stefik et al. | |
| 5,537,314 A | 7/1996 | Kanter | |
| 5,544,086 A | 8/1996 | Davis et al. | |
| 5,544,246 A | 8/1996 | Mandelbaum et al. | |
| 5,553,120 A | 9/1996 | Katz | |
| 5,577,109 A | 11/1996 | Stimson et al. | |
| 5,578,808 A | 11/1996 | Taylor | |
| 5,581,064 A | 12/1996 | Riley et al. | |
| 5,585,787 A | 12/1996 | Wallerstein | |
| 5,590,038 A | 12/1996 | Pitroda | |
| 5,592,560 A | 1/1997 | Deaton et al. | |
| 5,604,542 A | 2/1997 | Dedrick | |
| 5,608,785 A | 3/1997 | Kasday | |
| 5,612,868 A | 3/1997 | Off | |
| 5,619,558 A | 4/1997 | Jheeta | |
| 5,621,787 A | 4/1997 | McKoy et al. | |
| 5,621,812 A | 4/1997 | Deaton et al. | |
| 5,637,845 A | 6/1997 | Kolls | |
| 5,638,457 A | 6/1997 | Deaton et al. | |
| 5,642,279 A | 6/1997 | Stone et al. | |
| 5,642,485 A | 6/1997 | Deaton et al. | |
| 5,644,723 A | 7/1997 | Deaton et al. | |
| 5,644,727 A | 7/1997 | Atkins | |
| 5,649,114 A | 7/1997 | Deaton et al. | |
| 5,649,117 A | 7/1997 | Landry | |
| 5,649,118 A | 7/1997 | Carlisle et al. | |
| 5,653,914 A | 8/1997 | Holmes et al. | |
| 5,659,741 A | 8/1997 | Eberhardt | |
| 5,664,110 A | 9/1997 | Green et al. | |
| 5,664,157 A | 9/1997 | Takahira et al. | |
| 5,665,953 A | 9/1997 | Mazzamuto | |
| 5,672,678 A | 9/1997 | Holmes et al. | |
| 5,675,607 A | 10/1997 | Alesio et al. | |
| 5,675,662 A | 10/1997 | Deaton et al. | |
| 5,677,955 A | 10/1997 | Doggett et al. | |
| 5,684,291 A | 11/1997 | Taskett | |
| 5,687,322 A | 11/1997 | Deaton et al. | |
| 5,689,100 A | 11/1997 | Carrithers et al. | |
| 5,689,650 A | 11/1997 | McClelland et al. | |
| 5,692,132 A | 11/1997 | Hogan | |
| 5,696,907 A | 12/1997 | Tom | |
| 5,699,528 A | 12/1997 | Hogan | |
| 5,703,344 A | 12/1997 | Bezy et al. | |
| 5,704,046 A | 12/1997 | Hogan | |
| 5,705,798 A | 1/1998 | Tarbox | |
| 5,708,422 A | 1/1998 | Blonder et al. | |
| 5,710,458 A | 1/1998 | Iwasaki | |
| 5,710,886 A | 1/1998 | Christensen et al. | |
| 5,710,887 A | 1/1998 | Chelliah | |
| 5,710,889 A | 1/1998 | Clark et al. | |
| 5,715,399 A | 2/1998 | Bezos | |

(56) References Cited

U.S. PATENT DOCUMENTS

| | | |
|---|---|---|
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holman |
| 5,789,733 A | 8/1998 | Jachimowicz et al. |
| 5,790,636 A | 8/1998 | Marshall |
| 5,794,207 A | 8/1998 | Walker |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,826,243 A | 10/1998 | Musmanno et al. |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,897,621 A | 4/1999 | Boesch et al. |
| 5,905,246 A | 5/1999 | Fajkowski |
| 5,907,350 A | 5/1999 | Nemirofsky |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,946,669 A | 8/1999 | Polk |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,963,648 A | 10/1999 | Rosen |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 5,999,596 A | 12/1999 | Walker et al. |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,019,284 A | 2/2000 | Freeman et al. |
| 6,021,189 A | 2/2000 | Vu |
| 6,026,370 A | 2/2000 | Jermyn |
| 6,029,139 A | 2/2000 | Cunningham et al. |
| 6,029,144 A | 2/2000 | Barrett et al. |
| 6,029,890 A | 2/2000 | Austin |
| 6,032,136 A | 2/2000 | Brake, Jr. et al. |
| 6,032,859 A | 3/2000 | Muehlberger et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,044,360 A | 3/2000 | Picciallo |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |

(56) References Cited

U.S. PATENT DOCUMENTS

| | | |
|---|---|---|
| 6,078,891 A | 6/2000 | Riordan et al. |
| 6,091,817 A | 7/2000 | Bertina et al. |
| 6,092,056 A | 7/2000 | Tull, Jr. et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A | 8/2000 | Hardesty |
| 6,109,525 A | 8/2000 | Blomqvist et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,107 A | 9/2000 | Polk |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,129,572 A | 10/2000 | Feldman et al. |
| 6,134,309 A | 10/2000 | Carson |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,192,113 B1 | 2/2001 | Lorsch |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppicich |
| 6,223,143 B1 | 4/2001 | Weinstock et al. |
| 6,227,447 B1 | 5/2001 | Campisano |
| 6,243,688 B1 | 6/2001 | Kalina |
| 6,260,758 B1 | 7/2001 | Blumberg |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,344 B1 | 9/2001 | Marshall |
| 6,295,522 B1 | 9/2001 | Boesch |
| 6,298,336 B1 | 10/2001 | Davis et al. |
| 6,308,268 B1 | 10/2001 | Audebert |
| 6,324,524 B1 | 11/2001 | Lent et al. |
| 6,330,546 B1 | 12/2001 | Gopinathan et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,687,222 B1 | 2/2004 | Albert et al. |
| 6,693,544 B1 | 2/2004 | Hebbecker |
| 6,732,919 B2 | 5/2004 | Macklin et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D495,736 S | 9/2004 | Scharf |
| 6,793,135 B1 | 9/2004 | Ryoo |
| 6,802,008 B1 | 10/2004 | Ikefuji et al. |
| 6,805,287 B2 | 10/2004 | Bishop et al. |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,072,909 B2 | 7/2006 | Polk |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |

(56) References Cited

U.S. PATENT DOCUMENTS

| | | |
|---|---|---|
| 7,165,049 B2 | 1/2007 | Slater |
| D538,349 S | 3/2007 | Hollands |
| 7,216,091 B1 | 5/2007 | Blandina et al. |
| 7,225,155 B1 | 5/2007 | Polk |
| 7,243,839 B2 | 7/2007 | Beck et al. |
| 7,249,092 B2 | 7/2007 | Dunn et al. |
| 7,252,223 B2 | 8/2007 | Schofield |
| D551,705 S | 9/2007 | Mershon |
| 7,295,999 B1 | 11/2007 | Simon et al. |
| 7,315,843 B2 | 1/2008 | Diveley et al. |
| 7,346,567 B2 | 3/2008 | Weeks |
| 7,392,222 B1 | 6/2008 | Hamilton et al. |
| 7,392,224 B1 | 6/2008 | Bauer et al. |
| 7,401,731 B1 | 7/2008 | Pletz et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019793 A1 | 2/2002 | Frattalone |
| 2002/0019803 A1 | 2/2002 | Muller |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046255 A1 | 4/2002 | Moore et al. |
| 2002/0052754 A1 | 5/2002 | Joyce et al. |
| 2002/0062235 A1 | 5/2002 | Wahlbin et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0129221 A1 | 9/2002 | Borgin et al. |
| 2002/0138418 A1 | 9/2002 | Zarin et al. |
| 2002/0143703 A1 | 10/2002 | Razvan et al. |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |
| 2003/0018613 A1 | 1/2003 | Oytac |
| 2003/0023549 A1 | 1/2003 | Armes et al. |
| 2003/0028483 A1 | 2/2003 | Sanders et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0061157 A1 | 3/2003 | Hirka et al. |
| 2003/0074290 A1 | 4/2003 | Clore |
| 2003/0101119 A1 | 5/2003 | Persons et al. |
| 2003/0105672 A1 | 6/2003 | Epstein et al. |
| 2003/0110111 A1 | 6/2003 | Nalebuff et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0204421 A1 | 10/2003 | Houle et al. |
| 2003/0216965 A1 | 11/2003 | Libman |
| 2003/0229525 A1 | 12/2003 | Callahan et al. |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0039694 A1 | 2/2004 | Dunn et al. |
| 2004/0049452 A1 | 3/2004 | Blagg |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0193539 A1 | 9/2004 | Sullivan |
| 2004/0215507 A1 | 10/2004 | Levitt et al. |
| 2004/0243498 A1 | 12/2004 | Duke |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0035192 A1 | 2/2005 | Bonalle et al. |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0102228 A1 | 5/2005 | Srinivasan et al. |
| 2005/0108130 A1 | 5/2005 | Monk |
| 2005/0108152 A1 | 5/2005 | Tsoa Lee et al. |
| 2005/0119979 A1 | 6/2005 | Murashita et al. |
| 2005/0171898 A1 | 8/2005 | Bishop et al. |
| 2005/0199705 A1 | 9/2005 | Beck et al. |
| 2005/0234771 A1 | 10/2005 | Register et al. |
| 2005/0269396 A1 | 12/2005 | Schofield |
| 2006/0026092 A1 | 2/2006 | Klein et al. |
| 2006/0036553 A1 | 2/2006 | Gupta et al. |
| 2006/0047573 A1 | 3/2006 | Mitchell et al. |
| 2006/0047589 A1 | 3/2006 | Grau |
| 2006/0074794 A1 | 4/2006 | Nespola, Jr. |
| 2006/0085334 A1 | 4/2006 | Murphy |
| 2006/0106696 A1 | 5/2006 | Carlson et al. |
| 2006/0116903 A1 | 6/2006 | Becerra |
| 2006/0122918 A1 | 6/2006 | Graboske et al. |
| 2006/0131869 A1 | 6/2006 | Brignull |
| 2006/0144926 A1 | 7/2006 | Jacobs |
| 2006/0224480 A1 | 10/2006 | Bent et al. |
| 2006/0242057 A1 | 10/2006 | Velarde |
| 2006/0251478 A1 | 11/2006 | Desmeules |
| 2008/0177659 A1 | 7/2008 | Lacey et al. |

FOREIGN PATENT DOCUMENTS

| | | |
|---|---|---|
| EP | 0843292 A2 | 5/1998 |
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 99-54841 | 10/1999 |
| WO | WO 01/18699 | 3/2001 |
| WO | WO 01/69347 | 9/2001 |
| WO | WO 01/69347 A2 | 9/2001 |

(56) References Cited

FOREIGN PATENT DOCUMENTS

| WO | WO 01/69347 A3 | 9/2001 |
|---|---|---|
| WO | WO 2005/043277 A2 | 5/2005 |
| WO | WO 2005/043277 A3 | 5/2005 |

OTHER PUBLICATIONS

Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the Internet at http://www.firstmonday.org/issues/issue7_3/claessens, retrieved from the Internet on Oct. 6, 2006.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
Definition of Store-Value Card, Wikipedia, retrieved from the internet at http://en.wikipedia.org/wiki/Stored-value_card, retrieved from the Internet on Apr. 16, 2007.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996. p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glassman, et al., Citicorp Company Report, Report No. 1647151, p. 8 of 16.
Machlis, Have it the smart way: Burger King program drives smartcard use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hamey, Kenneth, Home Asset Management Accounts Link Mortgages Equity Lines.
Hoovers, General Mills, Inc. Corporate Profile relied upon to show the history of the company, http://cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Judy Quinn, Incentive Cards Explained, Incentive, Dec. 1995, 5 pages.
Incentive Firms Find Debit Cards A Rewarding Experience (Off-line debit card issuers converge efforts with companies looking for effective incentives to boost employee productivity and to motivate individuals to buy their products), Debit Card News, Vol.

(56) References Cited

OTHER PUBLICATIONS

Vincent Alonzo, Incentive Marketing . . . Three If by Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' Trans Pay Debit Card Helps Remote and Unbanked Employees Get Funds Quicker, Financial News, Mar. 18, 1997.
MailFrontier Survey Finds that Consumers Hold Financial Institutions Accountable for Online Identitly Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251.
Meridian-the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One No. For All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1(25), ISSN: 1069-7225, 17 pages.
Lazarony, Stuck for a gift? Give a prepaid credit card, www.bankrate.com, Dec. 21, 1998, 1 page.
Rossman, Kenneth, Summary Appraisal of Real Property.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Wells Fargo Blazes New Trail for Homeowners.
Kenneth Hein, What's the Deal?, Incentive, Jul. 1998, 7 pages.
Machlis et al., Will smart cards replace ATMs?, Computerworld, printed Feb. 23, 2001, 3 pages.
Glossman, et al.,, Glossman, et al., Citicorp Company Report, Report No. 1647151, p. 8 of 16.
LexisNexis Academic, NTS' TransPay Debit Card Helps Remote and Unbanked Employees Get Funds Quicker, Financial News, Mar. 18, 1997.
Meridian—the leader in card marketing, JA8343.
Incenticard, JA8329.
Award Card Comparision, JA7922.

(56) References Cited

OTHER PUBLICATIONS

CESNaBANCO introduces stored value card technology blockbuster video is first merchant partner.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

MailFrontier Survey Finds that Consumers Hold Financial Institutions Accountable for Online ldentitiy Theft, www.mailfrontier.com, Palo Alto, CA, Nov. 2004.

New 1-800-CALL-ATT Campaign Promotes One number for All Calls, AT&T Marketing, News Release, www.att.com/press/0297/970217.csa.htm, Feb. 17, 1997, 2 pages.

Payment data, www.paymentdata.com, Mar. 5, 2004.

Proton world and Europay to co-operate in creation of new CEPS-compliant a-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Spurgin, Sopininmonl or What's Happening in the Retail Credit Card Environment, Credit World Journal, vol. 85, No. 4, Mar. 1, 1997, pp. 20-23.

Lzarony, Stuck for a gift? Give a prepaid credit card, www.bankrate.com, Dec. 21, 1998, 1 page.

Key, Swift Gift Wows' Internet Shoppers, PR Newswire, www.key.com/swiftgift/home.html, Dec. 2, 1998, 1 page.

Stoughton, The Gift of Credit, www.washingtonpost.com/wp-stv/business, Dec. 14, 1998.

Swiftgift, Welcome to Swiftgift, Swiftgift, www.swiftgiftcard.com, Dec. 8, 1998, 10 pages.

* cited by examiner

METHOD AND SYSTEM FOR IMPLEMENTING A CARD PRODUCT WITH MULTIPLE CUSTOMIZED RELATIONSHIPS

RELATED APPLICATIONS

This patent application is a Continuation of U.S. patent application Ser. No. 13/528,936, filed Jun. 21, 2012, which is a Continuation of U.S. patent application Ser. No. 12/176,658 filed Jul. 21, 2008, now U.S. Pat. No. 8,245,909, issued Aug. 21, 2012, which is a Continuation of U.S. patent application Ser. No. 11/202,270 filed Aug. 12, 2005, now, U.S. Pat. No. 7,401,731 issued Jul. 22, 2008 and claims Priority to U.S. Provisional Application No. 60/684,985 filed May 27, 2005, which are hereby incorporated by reference herein in their entirety.

CROSS-REFERENCE TO RELATED APPLICATIONS

This patent application claims priority to U.S. Provisional Patent Application No. 60/684,985, filed May 27, 2005, which is hereby incorporated by reference herein in its entirety.

FIELD OF THE INVENTION

The present invention relates generally to a card product or access mechanism and, more particularly, to a card product or access mechanism with multiple relationships with an issuing entity (e.g., bank, etc.) where each relationship may be defined by one or more sets of rules that are customized for a particular customer.

BACKGROUND OF THE INVENTION

The growth and wide acceptance of credit cards have led to greater acceptance at the point of sale, increased availability of affinity and loyalty programs as well as greater convenience and security in making large payments. A credit card transaction typically involves a financial institution issuing a credit card to a consumer where the financial institution lends an amount of funds to the consumer and reduces the consumer's pre-set credit limit by the amount.

Cardholders generally refer to consumers and businesses that have accounts with issuers. Issuers solicit credit card accounts, extend credit, stimulate activity and usage, perform customer service, collect payments, and manage cardholder risk. Merchants may be any business, not-for-profit or government organization engaged in exchanging value via credit cards. Credit sales are settled to a merchant's demand deposit account (DDA) that the merchant has with a commercial bank, also referred to as a merchant bank.

A basic credit card transaction starts with the purchase of a good or service from a merchant with a credit card, which is swiped at a point of sale terminal or otherwise accepted and a transaction value is entered. The transaction is processed through a card association or a private label to the bank that issued the card. Assuming there are funds available under the consumer's credit limit, an authorization is routed back to the merchant through the same network. The approval is routed back to the merchant and the consumer signs the receipt or otherwise accepts the transaction.

Another type of credit card is a retail store credit card, which are credit cards generally issued by retail stores. These cards carry the name or logo of the issuing retail store and typically can only be used at the store that issued the card, including affiliated stores or other providers. Private label programs offer store cards by a third-party entity on behalf of the retailer. Typically, private label cardholders spend 2-2½ times the average amount spent by a customer. Much of the cost of the program comes from the merchant discount (2-3% of the sales), while other fees are derived from the processing of statements and cardholder accounts.

Most customers have multiple credit cards, which are separate and independent from each other. For example, a customer may have a co-branded credit card, several private label cards, debit cards as well as stored value cards for specific purchases. Traditional cards have static benefits and programs that generally cannot be modified. Therefore, as customers needs and goals change, additional card products may be required.

In view of the foregoing, it would be desirable to provide a method and system for a card product with multiple customized accounts which overcomes the above-described inadequacies and shortcomings.

SUMMARY OF THE INVENTION

According to an embodiment of the present invention, a method and a system provides a single card product (or identifier) that may be linked to multiple customized accounts, as defined by a set of rules. The accounts may represent one or more relationships between the customer and the card issuer, bank and/or other entity. Through an embodiment of the present invention, a line of credit may be provided to a customer where the line of credit may be shared by multiple accounts where each account may be customized. Other funding sources (e.g., funding account, etc.) may be shared by the multiple accounts. The multiple accounts may be of various types, including by way of example a stored value account, a debit account, a private label account, a co-brand account and/or other type of account. Other types of accounts and additional accounts may also be associated with the customer. Rules may be defined for applying one or more accounts to various purchases. For example, the rules may define when to use a particular account, how to make one or more payments, how to fund one or more accounts and/or other conditions. In addition, the line of credit may be available to a single customer and/or multiple customers who may be affiliated (e.g., family, business, partnership, etc.)

According to an exemplary embodiment of the present invention, a computer implemented method for implementing a mechanism with multiple customized relationships comprises the steps of identifying one or more customized rules for an access mechanism associated with a customer; establishing a plurality of accounts for the customer wherein the plurality of accounts comprise different accounts with different account characteristics; and invoking one of the plurality of accounts for a transaction through the access mechanism, based at least in part on the one or more customized rules; wherein the plurality of accounts share at least one funding account.

In accordance with other aspects of this exemplary embodiment of the present invention, the method may include the steps of monitoring customer behavior and adjusting the at least one of the plurality of accounts in view of the monitored customer behavior; wherein the customer behavior comprises one or more of spending habits, payment habits, assets, liabilities and investments; wherein the access mechanism comprises a single card product identified by an identifier; wherein the at least one funding account comprises a single line of credit; wherein the one or more priority rules are defined by the customer through an online interface; wherein the one or more customized rules comprise priority rules that define conditions for invoking a particular account of the plurality of accounts based on one or more transaction factors; wherein the transaction factors comprise one or more of transaction type, merchant identity, merchant type, transaction amount and time period of transaction; wherein the one or more customized rules comprise payment rules that define how payments are made for at least one of the plurality of accounts; wherein the one or more customized rules comprise funding rules that define one or more funding sources from which funds are drawn for the at least one funding account; wherein the step of invoking occurs at a point of sale for the transaction; wherein the plurality of accounts comprise a combination of stored value account, debit account, credit card account, loyalty account and co-brand account; wherein the customer comprises multiple customers wherein each customer has access to the plurality of accounts; wherein at least two or more of the plurality of accounts share benefits with each other.

According to an exemplary embodiment of the present invention, a computer implemented system for implementing a mechanism with multiple customized relationships comprises a rules module for identifying one or more customized rules for an access mechanism associated with a customer; and an accounts module for establishing a plurality of accounts for the customer wherein the plurality of accounts comprise different accounts with different account characteristics; and invoking one of the plurality of accounts for a transaction through the access mechanism, based at least in part on the one or more customized rules; wherein the plurality of accounts share at least one funding account.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

An embodiment of the present invention generally relates to card products or access mechanisms with multiple customized relationships (e.g., accounts, restrictions, privileges, etc.) as defined at least in part by a set of rules. A rule may include any algorithm or any executable procedure. The rules may define an account or other relationship with the card issuer, bank and/or other entity. According to an embodiment of the present invention, a single card product (or access mechanism, identifier, etc.) may link or associate multiple accounts or other relationships defined by a set of rules. Generally, traditional accounts are viewed and treated as separate accounts with a set of benefits and terms specific to each account or card product. An embodiment of the present invention provides an aggregate view of a customer's relations, behavior, credit history, transactions and/or other information. Rules may be applied to the multiple accounts associated by a single card product (or access mechanism) for a customer or group of affiliated customers (e.g., household, business, partnerships, agreement, etc.).

Figure 1:
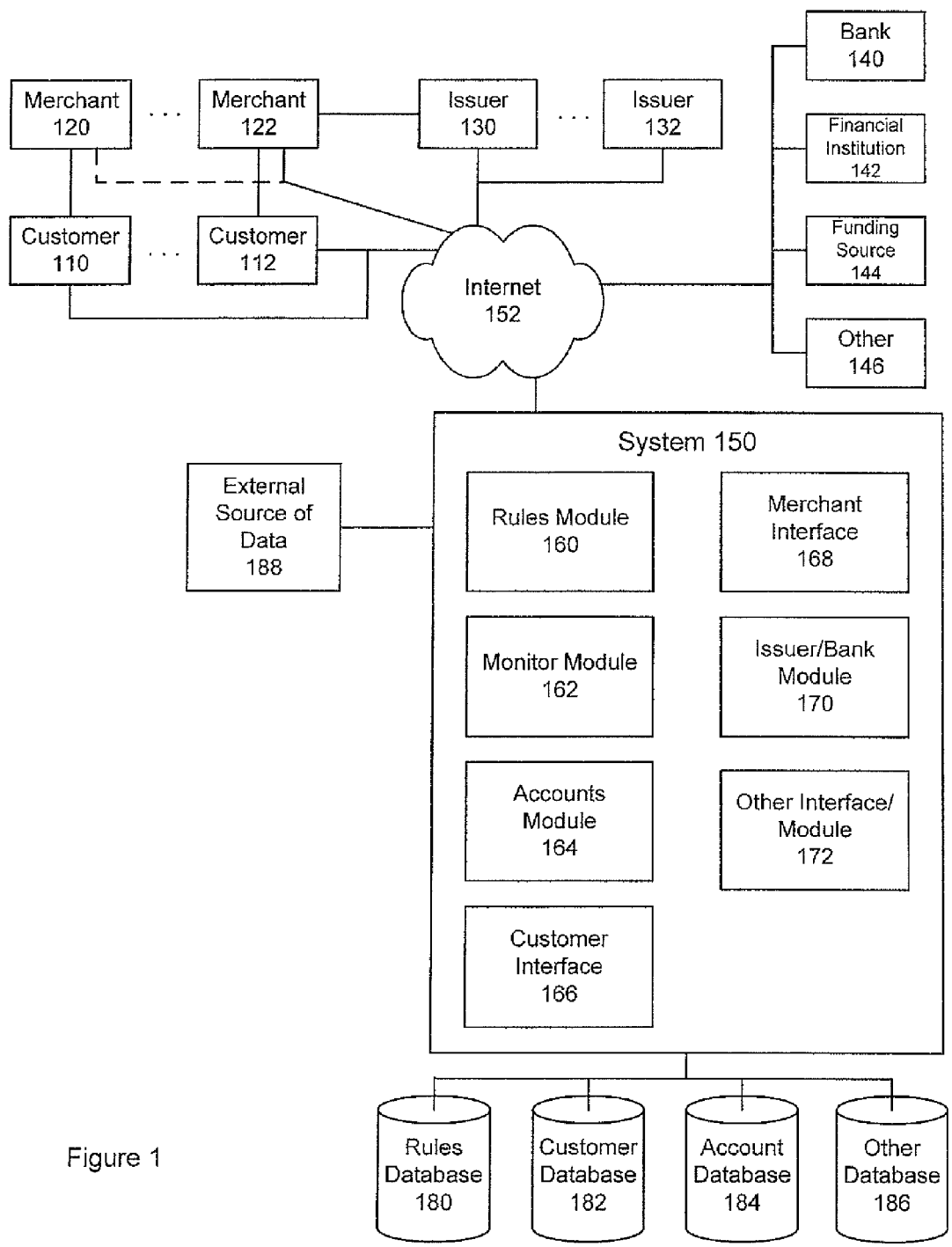
FIG. 1 is an exemplary diagram of a system for implementing a card product or other mechanism with multiple customized relationships, according to an embodiment of the present invention.

FIG. 1 is an exemplary diagram of a system for implementing a card product or other mechanism with multiple customized relationships, according to an embodiment of the present invention. Customers 110, 112 may engage in a transaction with various merchants, such as Merchants 120, 122 including other providers (e.g., service providers, etc.). When a customer makes a purchase with a card product (or mechanism), a merchant may communicate transaction data related to the purchase to a Card Issuer 130, through an acquirer, card association and/or other entity. Different processing environments may apply depending on the type of transaction. The customer may make the purchase at a point of sale where the customer physically hands the card product to the merchant. In another example, the customer may make the purchase over the Internet, via phone order and/or other form of purchase method. The card product may be a conventional plastic credit card. In addition, the card product may be an access mechanism, such as an identifier (e.g., card number, etc.), phrase (e.g., alias, etc.), biometric (e.g., fingerprint, retina scan, etc.), RFID (e.g., token, smart card, etc.), mobile device (e.g., cell phone, etc.), personal device (e.g., PDA, etc.) and/or other mechanism.

System 150 may be combined with or separate from Issuer 130, 132, Bank 140, Financial Institution 142 and/or other entity. System 150 may include modules for providing functionality associated with establishing and managing multiple customized relationships and/or accounts, according to the various embodiments of the present invention. For example, System 150 may include Rules Module 160, Monitor Module 162, Accounts Module 164, Customer Interface 166, Merchant Interface 168, Issuer/Bank Interface 170, and/or other interface or module 172. The modules and/or interfaces may be further duplicated, combined and/or separated across multiple systems at local and/or remote locations. The various modules of System 150 may access, communicate, manipulate and/or store data with respect to various sources, including one or more databases, external sources and/or other source of data.

Databases may include Rules Database 180, Customer Database 182, Account Database 184 and/or other database 186. Rules Database 180 may store customized rules that may be applied to the customer's account(s) and/or line of credit. Rules may include priority rules, payment rules, funding rules and/or other personalized rules, Customer Database 182 may include data related to customer behavior, customer credit history, customer spending habits, customer payment habits and/or other data. Account database 184 may store account information for customers, including customer preference data, status data, rewards data, etc. Other sources of information may also be accessed by the various modules and/or participants of system 100. In addition, System 150 may access external sources of data (e.g., world events, stock market, other sources of customer personal information, etc.), as shown by External Source of Data 188. The databases may be further combined and/or separated. The components of FIG. 1 may be duplicated, combined, separated and/or otherwise modified, as desired by various applications of the embodiments of the present invention as well as different purchasing environments and platforms.

Through an embodiment of the present invention, a funding account (e.g., a line of credit, etc.) may be provided to a customer where the funding account (e.g., line of credit, etc.) may be shared by multiple accounts (or relationships) where each account may be customized. The term "account" may represent a relationship with the card issuer, bank and/or other entity. The account or relationship may be defined by restrictions of use, privileges, and/or other definition. The rules themselves may be defined by the customer, bank, card issuer, merchant and/or other entity. The multiple accounts may be of various types. For example, the multiple accounts may include various combinations of a stored value account, debit account, private label account, co-brand account and/or other type of account. Other types of accounts and additional accounts may also be associated with the customer. For example, a customer may have a single card product with a co-branded VISA™ account, a department store private label account, a clothing boutique private label account and an electronic store private label account. All accounts may be accessed by the single card product. Depending on the defined rules, when a customer makes a purchase, the appropriate account will apply. The rules may be predetermined or dynamically selected (on the fly). For example, the customer may decide at the point of sale, which account will apply to the transaction.

Rules Module 160 may define various customized rules for an access mechanism associated with a customer. For example, rules may include priority rules, payment rules, funding rules and/or other rules associated with managing a line of credit, relationship or account. Rules may be defined for a customer or group of customers who may be affiliated (e.g., family, business, partnership, agreement, etc.). Rules may be defined by various entities, such as the customer, merchant, issuer, bank and/or other entity and various combinations thereof. Access rules for each of the customers from the group may also be defined.

According to an embodiment of the present invention, rules may be defined and customized for each customer. For example, priority rules may involve identifying which account (e.g., loyalty account, co-brand account credit card account, stored value account, etc.) to use for transactions, based on various factors. Through an embodiment of the present invention, a single card may assume multiple functions or characteristics by invoking one or more associated accounts, which may be based on various transaction factors. Transaction factors may include type of transaction, type of merchant or service provider, identity of merchant or service provider, transaction environment, transaction amount, time period of transaction and/or other factors. For example, a customer may define rules that determine which account will be invoked at certain merchants. In this example, a customer's purchase at a particular clothing store (including affiliated stores) may invoke a private label account. In another example, a customer may define rules that determine which account will be applied to transactions of a certain amount. For transactions less than a predetermined dollar amount (e.g., $5, etc.), a stored value account may be invoked. In another example, transaction type may determine which account will apply. The customer may indicate that all purchases at a gas station are applied to a loyalty account affiliated with a local gas station. The purchases at the gas station may earn the customer 4% back on the transaction amount. In another example, a customer may designate that all transactions at a particular store be applied to a co-brand VISA™ account where the customer may receive $20 gift certificates when the customer reaches a threshold purchase amount. In addition, the customer may define a rule to apply the $20 credit against the next month's balance.

Payment rules for the multiple accounts may also be defined. For example, a shopper may have a single card product with a private label account and a co-brand account. When it comes time to make payments, the customer may allocate a percentage of her single payment to each account. For example, the customer may allocate 40% to the private label account and 60% to the co-brand account. According to another example, the card issuer or other entity may override the payment allocations. For example, if a customer is having difficulty making payments, the card issuer may allocate the payments across the multiple accounts to ensure that at least a minimum amount is paid each payment cycle. The remaining payment amount may be applied to the account with the largest balance. Other payment rules may be defined by the card issuer and/or other entity.

Funding rules may also be implemented through an embodiment of the present invention. The customer may determine which sources of funds may be used to pay account balances of an embodiment of the present invention. Funding sources may include accounts associated with a Bank 140, accounts associated with Financial Institution 142 and/or other funding sources. For example, the customer may designate a plurality of bank accounts, such as savings account, checking account, etc., to fund various accounts of an embodiment of the present invention. Under certain conditions, the customer may also invoke a retirement account, investment account and/or other account. For example, the customer may define a funding rule to invoke a retirement account in the event that the savings account and checking account reach a predetermined low level threshold for critical payments, such as a mortgage payment.

In addition, the customer may designate full payment each month for both accounts from the customer's banking account(s). For example, the customer may indicate that 80% of the total balance is from the customer's checking account while 20% of the total balance is from the customer's savings account. According to another example, the customer may indicate that the full amount of all accounts are paid from the customer's checking account. However, if the customer's checking account balance reaches a low threshold of $2000, for example, the remainder may be paid from the customer's savings account thereby leaving at least an amount of $2000 in the customer's checking account. This also avoids a negative balance.

An embodiment of the present invention may establish a funding account to which funds may be deposited and from which payments may be made. For example, a funding account may have a single source of funds, such as a line of credit, which may be shared by the multiple accounts, as defined by rules. In addition, the customer may identify funding sources to fund the funding account according to funding rules. Exemplary funding rules may involve identifying a predetermined amount of funds for deposit into the funding account each month from a savings account and a checking account. According to another example, the customer may implement a direct deposit from the customer's paycheck into the funding account. Other rules for funding the account and making payments from the account may be implemented.

An embodiment of the present invention may also include a messaging channel to notify the customer of certain events.

For example, Customer Interface 166 may provide a messaging channel. Customer preferences may be defined for receiving messages where the customer may identify events, message type, message channel, etc. Events may include low threshold conditions, payment due, monthly status reports, etc. For example, when a recent payment pushes a funding source into a low level (which may be a predetermined low amount, e.g., $500), an email message (or other communication) may be sent to the customer where the customer may be prompted to designate an alternative funding source or add additional funds to the low funding source. Messages may include email, voicemail, text message, and/or other form of communication via a preferred mode of communication, such as computer, wireless phone, PDA and/or other mode of communication. Message type and/or mode of communication may be selected for the type of event. Multiple messages may be sent based on the urgency of the message. In addition, a hierarchical messaging structure may be implemented. For example, certain events may be designated as critical. At the occurrence of critical events, the customer may be notified via wireless phone. If an answer is not received with multiple (e.g., three) attempts, then an email message may be sent as a follow-up. Messages may also include status information and/or other non-critical data. These messages may be sent as an email to a preferred email address. Status information may include transaction data, payment data, and/or other account information.

Monitor Module 162 may monitor customer behavior, which may include spending habits, payment habits, life events, credit history and/or other information related to or that may have an affect on a customer. Monitored data may be gathered from various sources and/or specified by the customer (e.g., customer preferences, etc.). Based on the monitored customer behavior, an entity (e.g., merchant, issuer, etc.) may formulate incentives, reward programs and/or customized offers for the customer to promote loyalty and additional business. In addition, the entity may suggest modifications to the account, which may include modifying the account into a different type of account, canceling an account, adding an account, etc. For example, the customer may have the option to modify the stored value card into a loyalty card through an embodiment of the present invention.

Customers may define rules based on their current needs, goals, financial situation and/or other circumstances. In another example, the customers may select from one or more predetermined rules defined by the system of an embodiment of the present invention. For example, the system may determine that the customer has a high credit worthiness. For this customer, the system may generate a list of predetermined rules that provide a wide range of flexibility. In addition, the system may assess the customer's situation and offer tailored accounts for the customer. In another example, the system may determine that the customer has little credit history and a moderate level of credit worthiness. For this customer, the system may generate a list of different predetermined rules that are tailored to the customer but also achieve a level of protection to the card issuer and/or bank. Similarly, accounts and/or programs tailored to this type of customer may be offered.

According to another example, a system of an embodiment of the present invention may monitor the amount of fees paid as determined by an interest rate associated with a credit card. The system of an embodiment of the present invention may recommend a home equity line of credit (or other similar) product with a lower interest rate and suggest funding the credit card through this product, rather than incurring additional fees. In addition, the customer may be able to facilitate acquiring the recommended product, e.g., line of credit, through an embodiment of the present invention.

According to another exemplary scenario, various life events of the customer may be monitored and customized incentives, accounts, modifications and/or other recommendation may be presented to the customer. For example, certain life events may prompt new accounts or modifications. When a couple has a child, an embodiment of the present invention may offer to initiate a college savings fund. It may be determined through the customer's other investment funds that the customer is conservative or aggressive in investments. Therefore, customized investment opportunities (e.g., stocks, funds, real estate, etc.) consistent with the customer's investment behavior may be offered.

According to another exemplary scenario, it may also be determined that a customer travels to a certain region periodically (e.g., each year). As determined by the customer's current assets, an embodiment of the present invention may offer investment opportunities in the region that the customer visits. The type of investment may also be customized based on various factors, such as what the customer currently owns, assets, liability and overall ability to afford the investment.

According to an embodiment of the present invention, the various accounts and/or relationship may grow and transform as the customer or group of customers grow and mature. For example, the multiple accounts will have different features and functions for the customer during college as compared to when the customer is close to retirement. For example, during college, the customer may purchase transactions primarily from a debit account and stored value account. Also, the customer's credit card may have a low spending limit (e.g., $2000). Funding accounts may be limited to a checking account. As the customer approaches adulthood and assumes more responsibilities, the customer may now have a savings account, rent payments or mortgage payments, investments and/or other opportunities. When the customer has children, college funds may be established. As the customer's children approach college years, the customer may have more active savings plans, college funds, a second mortgage, home equity line of credit, etc. During retirement years, the customer may fund payments from a retirement account and prepare the account/relationship for transfer to the customer's children or other recipient. In addition, various tax considerations may also be factored into the customer's decisions.

Account Module 164 may manage the one or more accounts and/or relationships with various entities, such as merchants, banks, and/or other entities. An embodiment of the present invention may support various types of accounts, programs, products, etc. For example, through an embodiment of the present invention, a funding account (e.g., a line of credit, etc.) may be provided to a customer where the funding account (e.g., a line of credit, etc.) may be shared by multiple accounts where each account may be customized. The multiple accounts may be of various types. For example, the multiple accounts may include various combinations of a stored value account, debit account, private label account, co-brand account and/or other type of account. Accounts Module 164 may also manage the customer's rewards, benefits, incentives and/or other data associated with the various types of accounts. Other types of accounts and additional accounts may also be associated with the customer.

The customer may modify, add and/or delete rules, thereby modifying the corresponding accounts or relationships, at any time. As a customer's situation, needs and goals change, the rules applied to the multiple customized accounts may also change. Thus, the customer does not need to cancel and initiate new cards. Instead, the customers may easily modify, add and/or delete rules applied to the accounts, as well as add or delete accounts associated with the single card product. In addition, future event rules may also be defined. The system or customer may indicate that when a couple has a child, a new savings account may be established where all rewards points from other existing accounts are deposited into this savings account. Also, when the child reaches a certain age (e.g., 16 years old), the parents may initiate a low line credit card for the child. When the child enters college, the account may be modified to include a higher line of credit. The parents may share payment responsibility with the child. For example, the child may be responsible for 50% of the payment and the parents may be responsible for the remaining 50% for each payment cycle. During this time, the child may add new accounts, such as private label accounts, a university account, etc. Upon graduation, the child may assume full responsibility for the account on his own. Accordingly, payment rules may be modified to shift total payment responsibility to the child. As a precaution, the parents may designate a debit account (or other account) for payment of the child's account in the event the child does not have enough funds.

Accounts Module 164 may also maintain and manage rewards points and/or other incentives. Through an embodiment of the present invention, the customized multiple accounts may interact with each other and share benefits across the multiple accounts. For example, the multiple accounts may share reward programs, a common line of credit or lines of credits, rules for allocating rewards, payments and/or other actions. The line of credit may be adjusted dynamically by defined rules.

System 150 may also include interfaces customized for various participants to manage the accounts and/or relationships. For example, System 150 may include Customer Interface 166, Merchant Interface 168, Issuer/Bank Interface 170 and/or other customized interface 172.

Through Customer Interface 166, customers may select or define rules at a time prior to purchase. In another example, the customer may select or define rules at the point of sale, or just prior to check out. In addition, the customer may define rules to be applied retroactively to past purchases. At Customer Interface 166, the customer may specify preferences (e.g., alerts, rules, etc.); check status of payments, accounts, rewards, etc.; make modifications to the accounts, rules, etc. and/or otherwise manage the various accounts and/or other relationships.

Through Merchant Interface 168, Merchants and/or merchant partners may also apply rules that promote loyalty. For example, the merchant may modify the rewards program to further promote customer loyalty. Merchant partners may include a provider or other entity affiliated with the merchant. The merchant may increase the rewards percentage from 1% to 3% back. The merchant may offer a free gift, coupon or other reward when a total transaction amount reaches a certain level. A merchant affiliated with a co-branded account may offer a special double reward points during a short time period. During this time, all purchases may be automatically applied to the co-branded account for maximum reward returns. In another example, a grocery store may have access to a list of purchases for a particular customer (e.g., a customer's shopping list). In this scenario, the grocery store may offer incentives and/or rewards catered to the customer based on the recent purchases. In another example, the customer may request promotions based on the recent purchases. This may be accomplished through an online interface, e.g., web site.

While customers may define rules to customize the multiple accounts, card issuers may also define rules, through Issuer/Bank Interface 170. For example, if the customer becomes delinquent on payments, the card issuer may modify the payment rules so that at least a minimum amount is applied to each account. In addition, rather than issuing reward certificates, the card issuer may apply the reward dollars to the current balances, where priority is given to the account with the largest balance.

According to another embodiment of the present invention, a card issuer (e.g., bank or other entity) may offer various accounts and other features/benefits to customers based on customer data, such as customer situation, obligations (e.g., mortgage, home equity loans, school loans, etc.), payment history (e.g., minimum payment, delinquency, etc.), credit history (e.g., rating, score, etc.), behavior (e.g., credit activity, purchase activity, etc.), assets, liabilities, ability to pay, purchase activity, transaction type (e.g., type of merchandise, service, etc.), and/or other information. For example, the card issuer may assess a customer's situation at a point in time and determine whether certain accounts, benefits, loyalty programs, rewards, etc. may be of interest to the customer. Account activity data may be viewed across multiple accounts to provide an accurate view of the customer's current situation, obligations, needs, etc. Additional identity information, demographic information and/or other data may also be accessed and analyzed.

For example, a family of four may sign up for a co-branded family card having a single family account with four separate relationships for each family member tied to the single family card. The family card may be an access mechanism. Each family member may earn rewards based on his or her own transactions. The reward points may be pooled together into a common rewards account associated with the four separate relationships, all identified by a single co-branded family card. Each relationship may be represented as an account. In addition, each family member may have his or her own personalized family card that tics that family member to his or her own relationship, which may be defined as restrictions of use or other defined rule(s). After a few months, the family may collectively earn enough points to qualify for a free trip to their favorite amusement park. In another example, if the reward plan involves 1% back of all purchases, the reward earnings may be applied to each balance for each account. The reward earnings may be applied equally to all four accounts. In another example, the reward earnings may be applied based on predetermined percentages, amount of total transactions and/or other designation. Other rules may instruct all points earned by mom and dad to be applied to the kids' accounts, equally.

There may be a situation where little credit information about a customer is available or the credit information indicates the customer is not qualified for a co-branded or similar account. In this situation, customer behavior data may be assessed. Customer behavior data may indicate that a customer frequents a local music store on a regular basis. The customer may purchase a stored value card where the customer loads the card upfront with cash. The stored value card may be associated with a card issuer. After a period of time, the card issuer may then offer the customer a debit account, which may be linked to the same stored value card. The debit account may be linked to an existing account with the card issuer or the customer may initiate an account for the debit card. Customer behavior data associated with the debit account as well as the stored value card may be monitored. As the customer continues to make purchases and avoids delinquent behavior on the debit account, the card issuer may offer a private label account for the local music store, or other merchant or service provider. The private label account may initially start with a low line of credit and gradually increase as the customer's behavior continues to be positive. Once the customer establishes a positive credit behavior history, the card issuer may then offer the customer a co-branded account. Additional credit products, rewards programs, loyalty programs may be offered to the customer, based on customer behavior, transaction data and/or other available information. Through an embodiment of the present invention, a customer with little or no credit history, may be eligible for a co-branded account based on positive customer behavior with other less risky accounts and programs.

Figure 2:
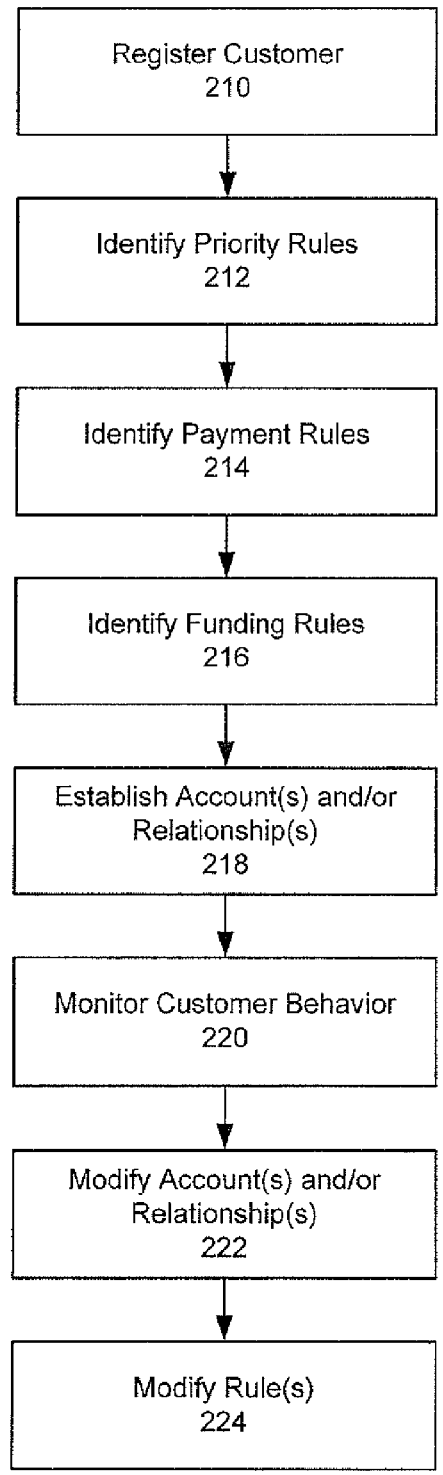
FIG. 2 is an exemplary flowchart illustrating a method for implementing a card product or other mechanism with multiple customized relationships, according to an embodiment of the present invention.

FIG. 2 is an exemplary flowchart illustrating a method for implementing a card product or other mechanism with multiple customized relationships, according to an embodiment of the present invention. At step 210, a customer may register with an embodiment of the present invention. Registration may also occur automatically when a new account is established for the customer. Registration may be in person at the point of sale, via online interface, phone, and/or other form of communication. Customer information (e.g., identity, address, etc.) may be gathered during registration. At step 212, one or more priority rules may be identified. Priority rules may determine what account applies to a particular transaction, based on various factors. The factors may be defined by the customer and/or other participant. For example, the customer may indicate that the customer wants to maximize reward points. The system may then respond by selecting an account for each transaction that will maximize rewards points for the customer. Other rules and/or preferences may be applied. At step 214, one or more payment rules may be identified. Payment rules may determine how payments are made for the various accounts. For example, certain accounts may have a higher priority than other accounts. In addition, the account with the highest interest rate may be paid off first. Other specifics regarding payment may be identified. At step 216, one or more funding rules may be identified. Funding rules may determine where or how to draw funds for payment. One or more funding sources may be identified. Funding sources may include banking accounts (e.g., checking account, savings account, etc.) and/or other sources of funds (e.g., investment funds, retirement funds, etc.). Funding sources may include various other banks, financial institutions, etc. For example, a funding account may be shared among multiple accounts.

At step 218, one or more accounts or relationships may be established for the customer or group of customers. For example, a customer may have various combinations of a stored value account, a credit card account, a loyalty account, a co-brand account and/or other relationship. At step 220, customer behavior and/or other data may be monitored. Customer behavior may include spending habits, payment habits, life events and/or other data. The monitored data may be used to offer incentives, suggest modifications, and/or other action. At step 222, the accounts and/or relationships may be modified. At step 224, the rules, including payment rules and/or funding rules, may be modified. Other characteristics, such as customer preference, may also be modified. While the steps are illustrated in one exemplary order, the steps of FIG. 2 may be performed in other sequences.

Figure 3:
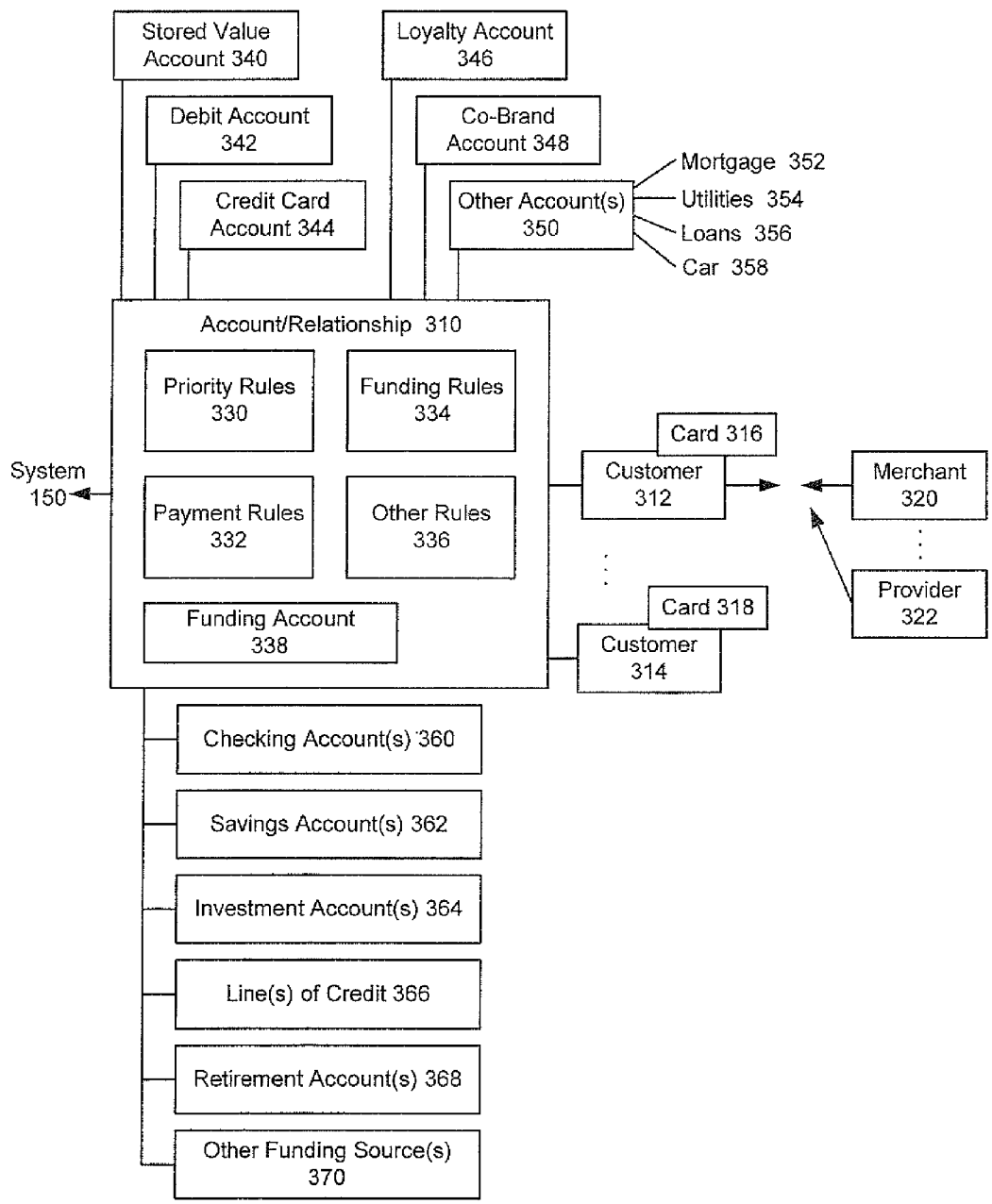
FIG. 3 is an exemplary diagram of a card product or other mechanism with multiple customized relationships, according to an embodiment of the present invention.

FIG. 3 is an exemplary diagram of a card product or other mechanism with multiple customized relationships, according to an embodiment of the present invention. A single card product or access mechanism may associate a customer with various accounts and/or relationships as illustrated by Account/Relationship 310. For example, the account or relationship may be associated with a single customer or group of customers, as shown by 312 and 314. Each customer may have a single card that may access various accounts and/or relationships through Account/Relationship 310. For example, Customer 312 may use Card 316 and Customer 314 may use Card 318 to make purchases and other transactions. According to other exemplary embodiments, multiple cards, access mechanism(s), identifier(s) and/or other mechanism for accessing the various accounts and/or relationships may be implemented. One or more rules may be defined for Account/Relationship 310. Rules may include Priority Rules 330, Payment Rules 332, Funding Rules 334 and/or other rules 336. For example, other rules may include rules associated with rewards, incentives, benefits, etc.

Priority Rules 330 may define which account is invoked for each transaction based on one or more defined conditions. The conditions may be based on transaction type, merchant or provider identity or type, transaction amount, timing of transaction and/or other condition defined by the customer and/or other entity. In addition, multiple accounts may be used for a transaction, based on the defined rules. The Account/Relationship 310 may include various accounts which may be associated with one or more customers 310, 312. The various accounts may include stored value account 340, debit account 342, credit card account 344, loyalty card account 346, co-branded account 348 and/or other types of card products, accounts and/or relationships with an entity. In addition, at the point of sale with merchant 320 (or other provider 322), the customer may override any predefined rule and select a preferred account. Other accounts 350 may also be maintained through an embodiment of the present invention, which may include mortgage 352, utilities 354, loans 356, car 358, etc.

Payment Rules 332 may define how payment is made for the one or more accounts. A customer may define payment priority rules identifying how payments are made for each account. In addition, other payments may also be made through an embodiment of the present invention. Other payments may include mortgage, utilities, loans (e.g., student loans, etc.), car, etc. For example, a payment rule may designate critical payments for certain expenses that have priority if funds are limited. In this example, a priority payment may be a mortgage payment. Additional payments may be identified in order of importance. For example, a customer may define a payment rule as paying mortgage payments through a credit card account, at a preferred time each month. According to another example, a customer may designate a single payment where payment is disbursed by certain percentages (e.g., 40% to credit card account, 20% to coffee shop loyalty card, 20% to grocery loyalty card, etc.). In addition, a customer may designate that a minimum amount is paid to each identified account where the remainder amount is spread evenly to all the accounts. According to another example, the payment amount may be disbursed by a percentage amount that corresponds to the balance on each account.

Funding Rules 334 may be defined for account/relationship 310. Various funding sources may provide funds to account/relationship 310. Funding sources may include checking account(s) 360, savings account(s) 362, investment account(s) 364 (e.g., stocks, mutual funds, etc.), line(s) of credit 366 (e.g., home equity, asset backed lines of credit, etc.), retirement account(s) 368 (e.g., IRA, 401K, etc.) and/or other funding source(s) 370, such as salaries, social security, pensions, annuities, etc.

According to an embodiment of the present invention, a funding account 338 (e.g., deposit demand account (DDA), etc.) may be implemented. While a single funding account is shown, multiple funding accounts may be implemented. In addition, the multiple accounts may share funding account 338. Payments to the various accounts may be made from funding account 338. Funding rules 334 may determine how funding account 338 (and/or other account) may be funded. According to another example, a funding rule may state that a credit card account may be funded from a home equity line of credit (or other funding source). For example, a system of an embodiment of the present invention may determine that the interest associated with a home equity line of credit is less than the interest rate associated with the credit card. Therefore, the system of an embodiment of the present invention may suggest a home equity line of credit for payment of one or more accounts with a high interest rate. If the home equity line of credit (or other similar product) already exists, the system of an embodiment of the present invention may compare the interest rates and recommend funding the credit card account with the preferred account.

The various rules, which may include priority rules, payment rules, funding rules, customer preference, etc. may define various aspects of the account/relationship 310. For example, the funding rules may specify that a customer's checking account is used to fund payment to one or more identified card products (e.g., co-branded card, stored value card). Another funding rule may specify that in the event that the checking account reaches a predetermined low threshold amount (e.g., $1000), mortgage payments and car payments are to be made from the customer's savings account. According to another example, the funding rule may specify that a predetermined amount from the customer's checking account and another predetermined amount from the customer's saving account is applied to the account/relationship 310. Using payment rules, the funded account may disburse payments accordingly. In addition, as the customer's financial situation changes, the funding of the accounts and/or payment of the accounts may also change to better accommodate the customer.

For example, a customer may specify that payment at a preferred grocery store will be made from the customer's checking account, each month or other predetermined time interval. For example, the customer may be identified as a participant in a store loyalty program at the preferred grocery store where payments are made from an identified checking account. As an incentive, the store may offer the customer 5% back on every dollar spent at the store (and/or other affiliated stores). From the store's perspective, this type of transaction may be preferred because the store does not pay an interchange fee for transactions funded through a debit account. Therefore, as an incentive, the store may offer more percentage points back for customers to use a debit card, instead of a credit card. As a result, the customer receives the incentive for using the debit card and the store receives the benefit of not having to pay interchange fees for a credit card transaction.

There also may be the situation where the customer's credit card offers an even more attractive incentive to use the credit card, instead of the debit type mechanism. The customer may simply elect to set a rule to maximize reward points (including rewards, incentives, etc.). The system of an embodiment of the present invention may determine which account or relationship will provide the most reward points to the customer. For example, a debit transaction may offer 5% back and a credit card transaction may offer 5.5% back. In this case, the credit card transaction will be selected to gain the most reward point for the customer. There also may be a situation where the customer participates in a number of different loyalty programs. An airline loyalty program may offer airline miles, a department store loyalty program may offer gift certificates in $20 increments and a coffee shop loyalty program may offer free drinks. The loyalty programs may accumulate dollars or rewards in different increments. For example, the airline loyalty program may offer 1% back on all transactions and 3% back for airline ticket purchases. The department store loyalty program may offer 1.5% back on all transactions and 4% back on purchases made at the department store. The coffee shop loyalty program may offer 1% back on all transactions and 6% back on all coffee store purchases.

The customer may define rules for invoking which account at different purchase opportunities. For example, it may be determined that the department store loyalty program offers the best reward for general transactions. In this case, if a rule is set to maximize reward points, the department store account will be used for all general transactions. Airline ticket purchases will be paid by the airline loyalty account and all coffee store purchases will be paid by the coffee store. According to another scenario, the customer may plan on traveling to Europe next year. Therefore, a rule may define that all transactions be made with the airline loyalty account to maximize loyalty points for the upcoming trip. Similarly, after Thanksgiving, a rule may be set to switch all transactions to the department store account to maximize reward points for gift giving season. Therefore, an embodiment of the present invention may manage an account to function in a particular manner to achieve a customer goal, such as maximize reward points, which may involve using a particular co-branded card for most all purchases and an appropriate loyalty card at a particular store to earn the customer more points (e.g., 6% back for loyalty purchase and 1% back for all other transactions).

Figure 4:
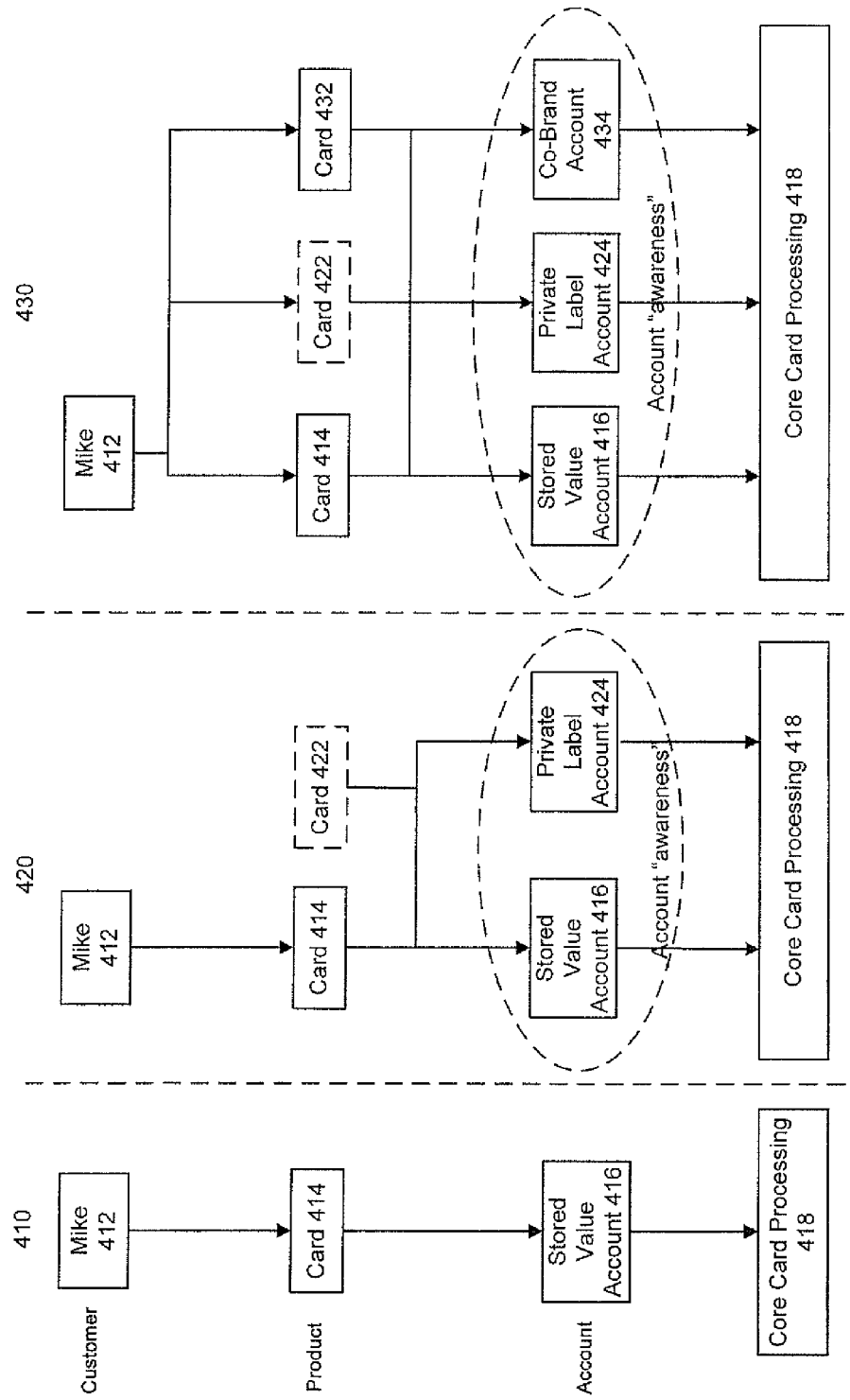
FIG. 4 is a diagram of an exemplary scenario for a card product with multiple customized accounts, according to an embodiment of the present invention.

FIG. 4 is a diagram of an exemplary scenario for a card product with multiple customized accounts, according to an embodiment of the present invention. According to an exemplary application, Mike 412 may purchase a stored value card 414 at JJ's Coffee Shop, with an initial load of $50 paid in cash. As shown by 410, Mike has a single stored value product 414 with an associated stored value account 416. A JJ's clerk may use a POS terminal or other device to establish and load the stored value card. A card issuer, such as a bank, may have a partnership (or other affiliation) with the coffee shop where the bank services JJ's payment products, including stored value cards. Core card processing 418 may establish and manage stored value account 416 for the customer. Core card processing 418 may be supported at least in part by the bank and/or other entity. For example, the bank's decisioning systems may be engaged as the stored value card 414 is being activated through the POS terminal. Mike's identity information along with other information may be captured when Mike registers the card on JJ's web site or other registration method.

The bank may determine that Mike, while not eligible for a co-brand card (since he is 18 years old and has no prior credit history), is eligible for a low-line JJ's private label account for use at JJ's retail locations and on the JJ's Coffee Shop web site. As shown by 420, a private label account 424 is added, which may be linked to and accessed via the stored value card 414 and/or a personalized card 422. Mike may access either account with Card 414 or Card 422. For example, rather than issuing another card 422, Mike may use Card 414 to access either account. The transactions may be routed to an appropriate account or accounts based on rules. The linked accounts may support promotional, auto-reload, loyalty and/or other programs. An appropriate offer may be generated for presentation to Mike at the next stored value reload opportunity and/or other opportunity (e.g., via email, regular mail, telephone contact, at the next purchase, etc.). The offer may be generated by a pre-decisioning database or other engine through core credit processing 418.

Mike continues to return to JJ's for several delicious latte purchases with his stored value card 414. Through an integrated POS loyalty system of an embodiment of the present invention, when it comes time to reload his stored value card 414, the clerk may inform Mike that he may activate a line of credit to automatically pay for his stored value reloads and conveniently billed at the end of the month. He is also offered an attractive coffee mug as a gift for activating this option. Mike may accept the offer and agree to activate the auto-reload feature between the private label account 424 and the stored value account 416. He may set his re-load amount at $50 or other predetermined amount. The program terms may indicate that purchase transactions less than $5 are applied to the stored value account 416 and purchase transactions greater than $5 are applied to the private label account 424. According to another example, Mike may select transaction designations to the accounts. In this example, Mike signs the private label agreement printed by the POS terminal and the clerk indicates Mike's acceptance, initiating a new account setup process on the bank's servicing platform.

Mike returns to JJ's repeatedly, automatically reloading the stored value account 416 when the balance reaches zero or a predetermined minimum amount. Mike also purchases an espresso machine for $200 from JJ's Coffee Shop web site using his private label account 424. Mike receives a single statement each month showing all his transactions and balances, it may include a designation that the transaction was a promotional purchase.

Loyalty review processes of core card processing 418 may monitor Mike's purchases at JJ's on both the stored value account 416 and private label account 424. After making various purchases and reloads via the stored value account 424 and the private label account 416, Mike hits a $320 promotional spending hurdle at JJ's. This triggers a POS coupon for a free latte on his next trip to the store. Other incentives and thresholds may be activated and customized.

A few months later, risk review processes of core card processing 418 may determine that Mike's excellent spending and payment behavior now makes him eligible for a JJ's co-brand Visa™ card 432 associated with co-brand account 434 in addition to private label account 424. While separate cards are shown, each account may be accessed by any card. For example, the additional accounts may be added to the initial card 414. Separate cards for each account may be implemented. The bank may send Mike an offer to upgrade his account via the mail (or other communication method), and also notifies channels (including JJ's POS) to inform Mike of the offer at the next opportunity or other event. Mike reads his mail and calls the card issuer to activate the Visa™ capability on his card. He provides information to establish the Visa™ co-brand account 434. The new co-brand account 434 may be set up on the bank's servicing platform of core card processing 418, and appropriately linked to stored value account 416 and private label account 424, as shown by 430. The new co-brand account 434 is "aware" of Mike's stored value account 416 and private label account 424. Based on rules, rewards from the co-brand account 434 may be applied to the stored value account 416. During application, Mike may select a loyalty program that allows all of the 1% rewards that accumulate on the co-brand to be swept to the stored value balance on a monthly basis.

Mike may begin using his new co-brand account 434 at other merchants. With a single card product, Mike has access to all his customized accounts. Each month, Mike may receive a single branded JJ's statement showing balances as well as spending and rewards activity across his accounts. Mike may send a single check with the remit coupon from the statement. On the remit coupon or through an online interface, Mike may specify the amounts he wants applied to each of the account balances. If Mike does not specify an allocation, the payment may be allocated equally across Mike's accounts or other default allocation may apply. In addition, Mike may define payments rules and/or funding rules to the accounts. For example, Mike may specify that the single payment is applied by percentage amount to the accounts (e.g., 40% of the private label account and 60% to the co-brand account). Funding rules may define how the payment is funded. For example, Mike may specify that the payment amount is withdrawn directly from Mike's checking account. Mike may also specify that the payment amount is withdrawn from the checking account unless a low threshold of $2000 is reached. In that event, the remainder is withdrawn from Mike's savings account. Other variations may be applied.

According to another exemplary scenario, after six months of enjoying the benefits of his new accounts, Mike may experience financial difficulties, such as losing his job, which may lead to late payments and/or other defaults. For example, after several late and/or missed payments, an embodiment of the present invention having access to Mike's current situation may respond accordingly. For example, an embodiment of the present invention may enroll Mike into a payment plan and close his co-brand account 434 and/or private label account 424. As the stored value account 416 has less risk involved, this account may be pre-loaded at smaller increments to allow Mike some flexibility. Therefore, an embodiment of the present invention may adjust and respond according to the customer's financial situation.

Figure 5:
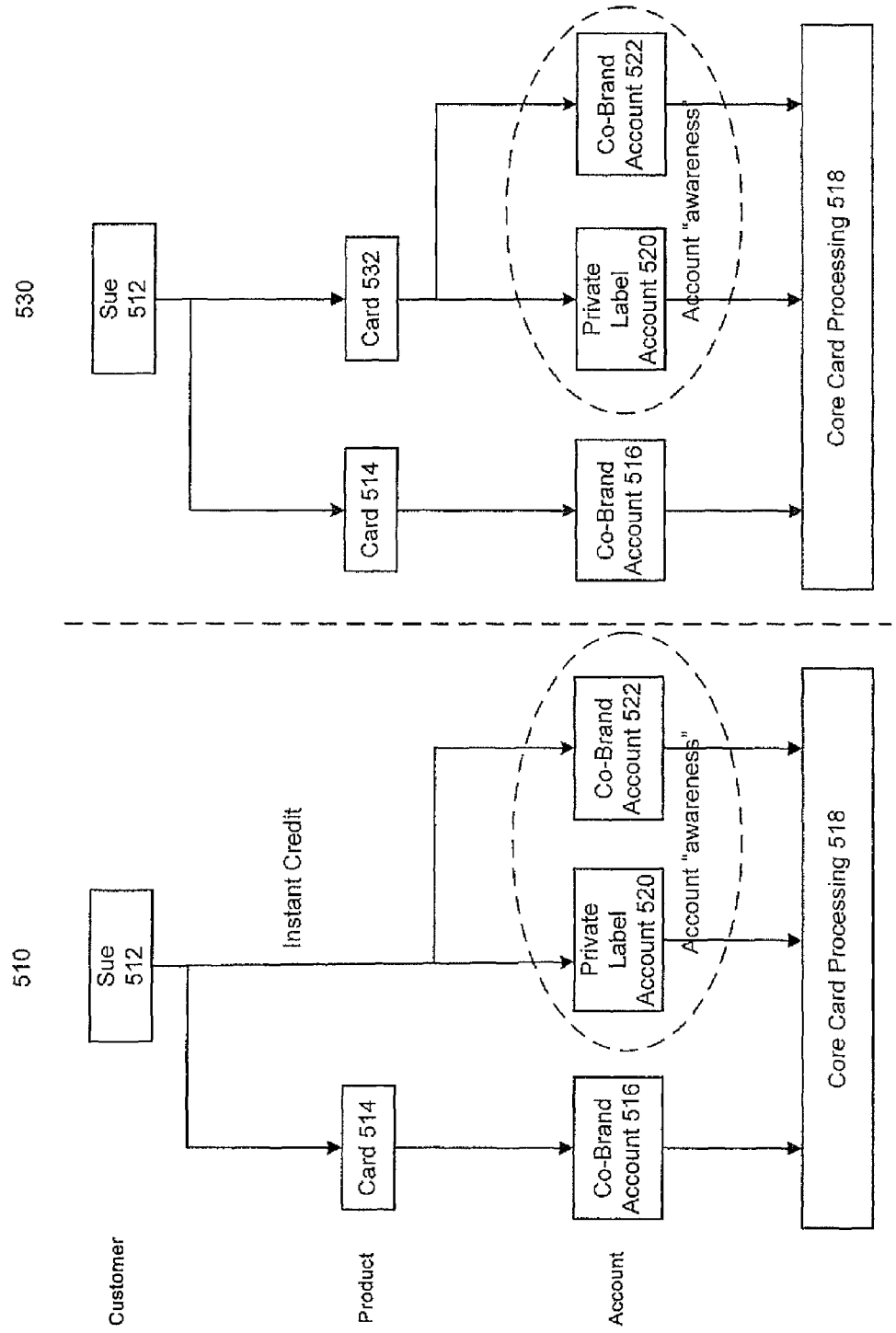
FIG. 5 is a diagram of another exemplary scenario for a card product with multiple customized accounts, according to an embodiment of the present invention.

FIG. 5 is a diagram of another exemplary scenario for a card product with multiple customized accounts, according to an embodiment of the present invention. This exemplary application may involve Sue 512 who is a frequent buyer of fashions at Ultimate Department Store. During a visit, Ultimate is offering a 10% off purchase to open an account with Ultimate Department Store. Upon check-out, the clerk extends the offer to Sue who gladly accepts. Using a POS device, the clerk captures Sue's mailing address and other personal information from her application, and submits the information to a bank (card issuer or other entity).

Bank decisioning environment provided by core card processing 518 may evaluate the application and determine that Sue is eligible for a dual account relationship consisting of an Ultimate Private Label account 520 and an Ultimate Co-Brand account 522, accessible via a single card product, as shown by 510. Other products, accounts and/or services may be applied to different customers with different qualifications. The bank may determine Sue has an existing co-brand account 516. The existing co-brand account 516 has a $5000 line with a partner in an unrelated industry. The decisioning environment of core card processing 518 may calculate a maximum exposure of $12,000. The net allowed exposure of $7000 is allocated as $2000 and $5000 to private label account 520 and co-brand account 522, respectively.

The POS response informs the clerk that Sue has been approved for the dual account product and posts the purchase with the 10% discount to the private label account 520. Sue stops at the cosmetics counter to purchase new perfume on her way out of the store. Since Sue just had her account approved (e.g., instant credit), the clerk quickly looks-up her new account so she can purchase the product using her new account.

Two weeks later, Sue receives her Welcome Kit with an additional Ultimate promotion for purchases over $1000. Sue has been considering purchasing a large plasma TV for her husband, and immediately returns to Ultimate to explore the options. She finds a suitable model that will cost $1800 after the promotion, which also includes a 6 month same-as-cash feature.

At check-out, Sue pays for the purchase with her new dual account card 532, as shown by 530. The purchase amount causes private label account 520 to exceed its credit limit. However, the $5K line on the associated (linked) co-brand account 522 has sufficient open to support the purchase. The rules associated with the dual account relationship permit dynamic line sharing, so account maintenance actions are initiated real-time to increase the private label line and decrease the co-brand line—with no additional credit exposure to the issuing bank. The transaction is approved and posted to private label account 520.

At cycle time, Sue receives her dual account statement showing the current line on both the private label account 520 and co-brand account 522. The promotional balance for the plasma TV is also highlighted. During "bill night," Sue logs onto a web site and allocates her single $1000 payment (a single demand deposit account) across her co-brand account 522 and private label account 520. Since payments may be scheduled in advance, Sue also records a payment, 90 days in advance, specifically allocated to the plasma TV transaction. Core credit processing 518 may determine that Sue does not use the existing co-branded account 516 (e.g., no activity in the last 24 months) and may give Sue the option to close this account. According to another example, the new accounts 520, 522 may be added to the existing card 514, so that a single card product may manage the existing account 516 and the new accounts 520, 522.

Figure 6:
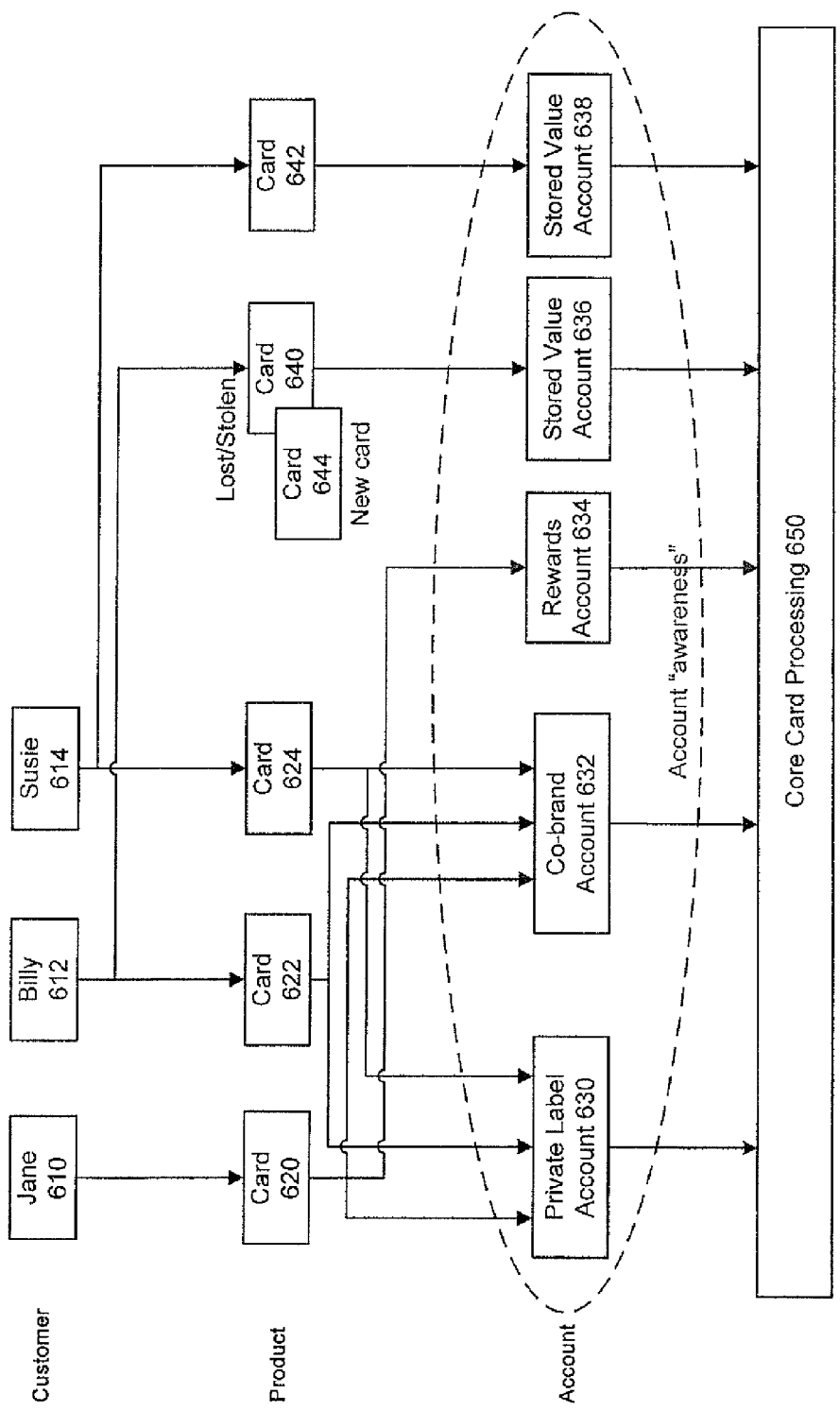
FIG. 6 is a diagram of yet another exemplary scenario for a card product with multiple customized accounts, according to an embodiment of the present invention.

FIG. 6 is a diagram of yet another exemplary scenario for a card product with multiple customized accounts, according to an embodiment of the present invention. According to another exemplary application, Jane 610 has a Monster World Co-Brand/Private Label dual account with the Family option. She wants to infuse a little financial responsibility into her children Billy 612 and Susie 614. The Family Card option allows Jane to allocate monthly spending and cash limits for her children, thereby providing a new way to give and monitor allowance.

Jane and her two children have been actively using their cards to build points for a summer trip to Monster World amusement park. Both the co-brand account 632 and private label account 630 earn points. To quickly see how many points they have accumulated, Jane decides to customize her point accumulation to a rewards account 634, where all the designated accounts accumulate to a single account. Thus, she can redeem directly from the rewards account, load stored value cards with automatic currency conversion from the account, and/or set rules on the rewards account 634 for redemption for each family member. Other customized rules may be defined as well.

Prior to the summer trip, Jane establishes stored value accounts for each of her children 640, 642. Since her children will be running all over and experiencing the rides, she finds this is the safest solution. Jane initially loads stored value accounts 636, 638 from a combination of private label account 630, co-brand account 632 and rewards account 634 in order to take maximum advantage of available promotions.

While on a ride, Billy 612 loses his stored value card 640. After finding his parents, they proceed to the Theme Park Office. Using a kiosk, they may deactivate the lost stored value card 640 and generate a new stored value card 644. In addition, a customer may access a portable device (e.g., cell phone, PDA, etc.) to deactivate (or otherwise modify) the accounts. Jane may activate the new card 644 and load additional value from her private label account 630 (or other source). Billy may also load additional value to the card from private label account 630. Core card processing 650 may manage the various accounts, privilege, restrictions and uses.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A computer implemented method for implementing a payment mechanism with multiple customized relationships, the method comprising the steps of:
    associating, by at least one computer processor, a plurality of accounts with a payment mechanism for a customer wherein the plurality of accounts are funded by a funding account, each account having different account characteristics;
    identifying one or more priority rules for defining which account to invoke for the customer;
    monitoring, by at least one computer processor, customer behavior; and
    invoking one account from the plurality of accounts for the customer based at least in part on the one or more priority rules and customer behavior.

2. The method of claim 1, wherein each of the plurality of accounts represents a relationship with a bank.

3. The method of claim 1, wherein the step of monitoring customer behavior comprises monitoring a checking account balance associated with the customer.

4. The method of claim 1, further comprising the step of: based on the customer behavior, generating one or more incentives, rewards and offers for the customer.

5. The method of claim 1, further comprising the step of: modifying at least one account from the plurality of accounts.

6. The method of claim 1, wherein the funding account funding the plurality of accounts comprises a checking account.

7. The method of claim 1, wherein the one or more priority rules are defined by a financial institution.

8. The method of claim 1, wherein one or more features and benefits associated with each of the plurality of accounts is based at least in part on customer data.

9. The method of claim 1, wherein the customer behavior comprises one or more of spending habits, payment habits, assets, liabilities and investments.

10. The method of claim 1, wherein at least two or more of the plurality of accounts share benefits with each other.

11. The method of claim 1, wherein the one or more customized rules are adjusted.

12. A computer implemented system for implementing a mechanism with multiple customized relationships, the system comprising:
    an accounts module, comprising at least one computer processor, configured to associate a plurality of accounts with a payment mechanism for a customer wherein the plurality of accounts comprise different accounts with different account characteristics; the plurality of accounts comprising at least one or more: debit account, checking account and savings account;
a monitor module, comprising at least one computer processor, configured to monitor customer behavior; and
a rules module, comprising at least one computer processor, configured to identify one or more priority rules for defining which account to invoke from the plurality of accounts for the customer based at least in part on the one or more priority rules and customer behavior.

13. The system of claim 12, wherein each of the plurality of accounts represents a relationship with a bank.

14. The system of claim 12, wherein the monitor module is further configured to monitor a checking account balance associated with the customer.

15. The system of claim 12, wherein the rules module is further configured to generate one or more incentives, rewards and offers for the customer based on the customer behavior.

16. The system of claim 12, wherein at least one account from the plurality of accounts is modified.

17. The system of claim 12, wherein the funding account funding the plurality of accounts comprises a checking account.

18. The system of claim 12, wherein the one or more priority rules are defined by a financial institution.

19. The system of claim 12, wherein one or more features and benefits associated with each of the plurality of accounts is based at least in part on customer data.

20. The system of claim 12, wherein the customer behavior comprises one or more of spending habits, payment habits, assets, liabilities and investments.

21. The system of claim 12, wherein at least two or more of the plurality of accounts share benefits with each other.

22. The system of claim 12, wherein the one or more customized rules are adjusted.

* * * * *